April 12, 1932.  L. SKEEL  1,853,153
UNIVERSAL BRACKET
Filed March 13, 1930   2 Sheets-Sheet 1

Inventor
LEWIS SKEEL

April 12, 1932. L. SKEEL 1,853,153
UNIVERSAL BRACKET
Filed March 13, 1930 2 Sheets-Sheet 2

Inventor
LEWIS SKEEL
By
Attorney

Patented Apr. 12, 1932

1,853,153

UNITED STATES PATENT OFFICE

LEWIS SKEEL, OF MEADVILLE, PENNSYLVANIA

UNIVERSAL BRACKET

Application filed March 13, 1930. Serial No. 435,528.

This invention relates to adjustable brackets and more particularly to a universal joint therefor.

The invention forming the subject of this application will be found to be in the nature of an improvement on the bracket shown in United States Patent No. 1,423,535 issued July 25, 1922 to Frank P. Miller, and an important feature of the invention resides in the friction means by which the several arms or sections of the bracket are held securely in adjusted position against the contrary influence of the weight of the lamp or other article carried thereby and vibration incident to the operation of the machine to which the bracket is applied, it being noted that the connecting means between the various sections of the bracket allows of the adjustment of the lamp or other article in any direction with uniform facility.

A further and equally important object of the invention is to provide a universal joint which is simple to assemble, durable in use and relatively cheap to manufacture.

Other objects and advantages will be apparent during the course of the following description.

In the accompanying drawings forming a part of this application and in which like numerals are employed to designate like parts throughout the same.

Figure 1:
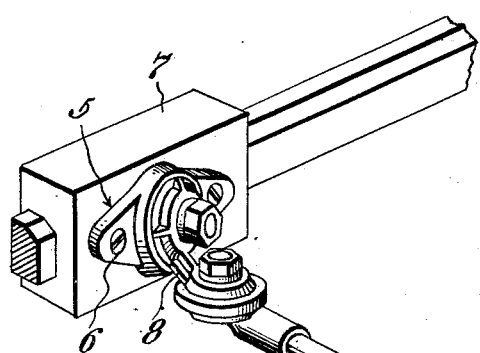
Figure 2:
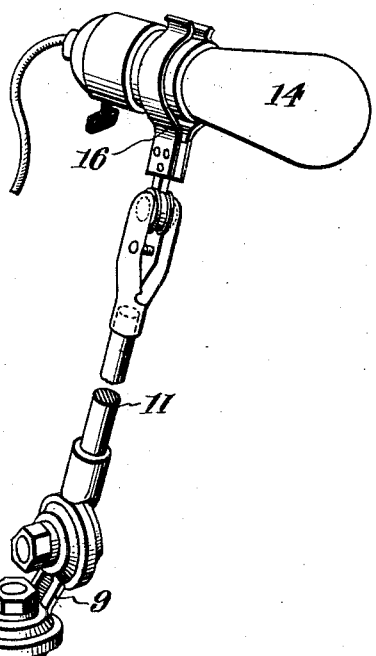
Figure 2:
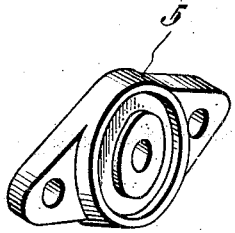
Figure 3:
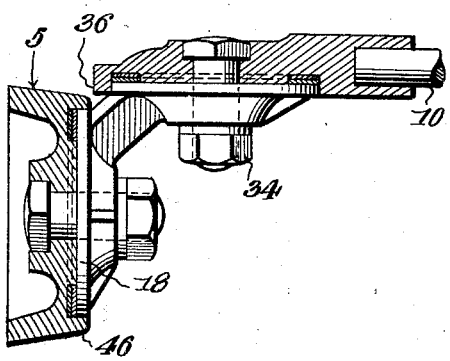
Figure 4:
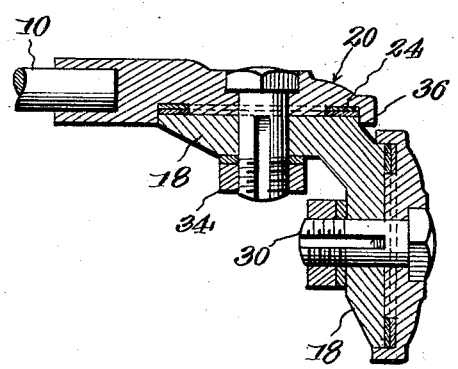
Figure 5:
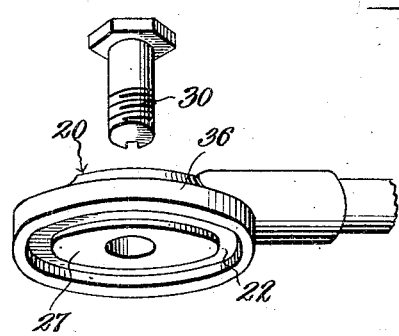
Figure 5:
Figure 5:
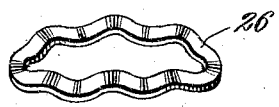
Figure 5:
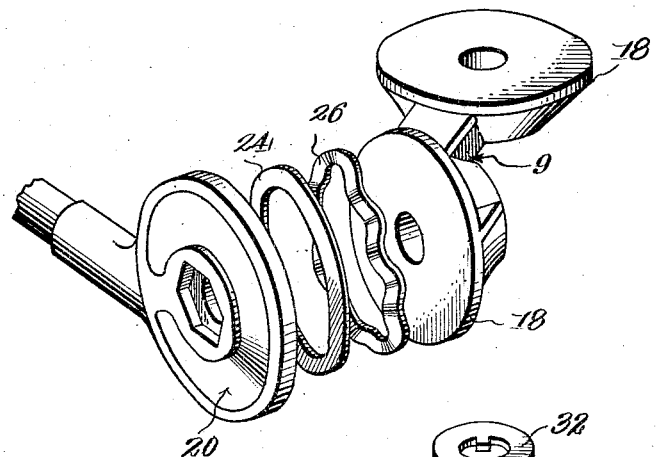
Figure 5:
Figure 5:

Figure 1 is a fragmentary perspective illustrating an installation of the improved bracket, Figure 2 is a perspective of an attaching plate embodied in the invention, Figure 3 is a detailed sectional view through the attaching plate and associated elements, Figure 4 is a detailed sectional view illustrating the means by which the main arms of the bracket are connected, Figure 5 is a group perspective illustrating the parts of a joint embodied in the invention.

In the drawings wherein for the purpose of illustration is shown a preferred embodiment of the invention, the numeral 5 designates an attaching plate having apertured ears for the reception of fastening devices 6 by which the bracket is attached to a support 7 such as a lathe, a drill press or possibly a grinder.

The attaching plate 5 is shown to have connection with a universal joint 8 corresponding in construction to the universal joint 9 except in minor details that will be described.

The joint 9 provides a universal connecting means for a pair of more or less similar arms or sections 10 and 11, the arm 10 being connected to the joint 8, while the arm 11 has connection with a lamp 14 or other article through the medium of a clamping device 16.

As shown in Figure 5, the universal joint 9 embodies a pair of bearing members 18 joined by a shank or web. Each bearing member 18 is arranged in opposed relation to a complemental bearing member 20, the inner face of which is formed with an annular groove 22 adapted for the reception of separate plain and undulated or radially corrugated annuli 24 and 26, respectively. As shown in Figure 4, the annuli 24 and 26 are snugly received in the associated groove 22 and are held therein by the opposed face of the bearing member 18.

The plain washer or annulus 24 is preferably of a material, such as fibre, having high frictional properties, while the radially corrugated annulus 22 is of a metal having a high degree of flexibility so that the undulations thereof will have firm pressure contact with the opposed surfaces of the annulus 24 and the bearing member 18. Figures 4 and 5 illustrate that the annular groove 22 in each bearing member 20 defines a central or concentrically located spacing element 27 by which pressure on the radially corrugated washer 26 and the washer 24 is limited so that damage to the various parts of the joint as a result of maladjustment is avoided. The members 18 and 20 are formed with centrally disposed openings adapted for alignment to receive a screw bolt or pivot element 30, the forward terminal portion of which is threaded and is grooved longitudinally with connection with a lock washer 32 and a nut 34.

It is important to observe that the groove 22 in each bearing member 20 defines a peripheral flange or skirt 36 closely encircling and embracing the associated annuli 24 and 26 and extending about the periphery of the complemental member 18 to not only hold the members 24 and 26 in place but to exclude dust and other foreign matter. In Figure 4, it is clearly illustrated that each peripheral flange 36 is extended beyond the plane of the surface of the associated concentrically disposed spacing element 27 so that the flange has the desired overlapping relation with the opposed complemental member 18.

It is believed to be apparent that although only one of the swivel joints of the connection 9 have been described, both of the swivel joints constituting such connection may be alike.

The construction illustrated in Figure 3 will be found to differ from what is shown in Figure 4 only in that the place of one of the bearing members is taken by the attaching plate 5 which is adapted for connection to a suitable support and which is formed with an annular flange 46 corresponding to the annular flange 36 and embracing the associated member 18.

Particular attention might be directed to the fact that the undulations or radial corrugations of the several annuli 26 embodied in the invention are unbroken so that while ample friction surface is provided between the several annuli and the associated parts, the presence of sharp edges that are likely to bite into the opposed surfaces are avoided. That is to say, the absence of radial incisions or slits in both the annuli 24 and 26 avoids excessive wear on the opposed surfaces and at the same time provides the desired frictional contact between the parts of the assembly.

Also, the absence of radial incisions in the several washers provides for the expeditious adjustment of the arms 10 and 11 in the several directions in which the same may be moved.

In more specifically adverting to this latter phase of the invention, it is pointed out that the arms may be adjusted in both clockwise and counter-clockwise directions with equal ease and facility. The absence of radial incisions avoids the creation of a ratchet effect that would tend to resist the movement of the arms in one direction and at the same time permit of the uncontrolled shifting of the arms in the other direction.

The various parts of each joint may be assembled in a highly convenient and expeditious manner and the previously described contact between the various parts of the device provides the desired friction so that the parts are held in adjusted position against the vibration and strains incident to use.

Having thus described the invention, what is claimed is:

1. In a bracket, the combination of a pair of complemental members, one of which is formed in the inner surface thereof with an annular groove defining a concentrically arranged spacing element, a pair of washers in said groove, one of said washers being radially corrugated for frictional engagement with the other washer and the opposed face of one of the members, and a pressure member joining said complemental members, said spacing element constituting a means to limit pressure on said washers.

2. In a lamp bracket, a pair of complemental members having central openings, a pivot element extending through said central openings, one of said members being provided with an annular groove and an annular flange, a pair of washers in said groove and surrounded by said flange, one of said washers being formed with radial corrugations, said annular flange of one of the members being in overlapping relation with the edge of the other member.

3. In a lamp bracket, a pair of complemental members, a pivot element connecting the members, one of the members being provided with an annular groove defining an annular flange and a central spacing element, and a pair of unbroken annuli in said groove, one of said annuli being of a fibrous material and the other being formed with radial corrugations, said annuli being embraced by and held against spreading said annular flange, said flange of one member being in overlapping relation with the other member to exclude dust.

4. A hinge joint comprising a pair of disk shaped complemental members having bearing surfaces, a pivot element in the form of a screw bolt extending through said complemental members and having means whereby the same may be drawn together, one of said members being provided with a countersunk recess defining a peripheral flange, the inner wall of the recess having an annular groove adjacent to the flange, defining a central spacing element, the other of said bearing members being received in said recess and confined by said peripheral flange, a pair of washers in said groove and surrounded by said flange, said central spacing element forming a means to limit pressure on said washers.

In testimony whereof I affix my signature.

LEWIS SKEEL.